Figure 1:
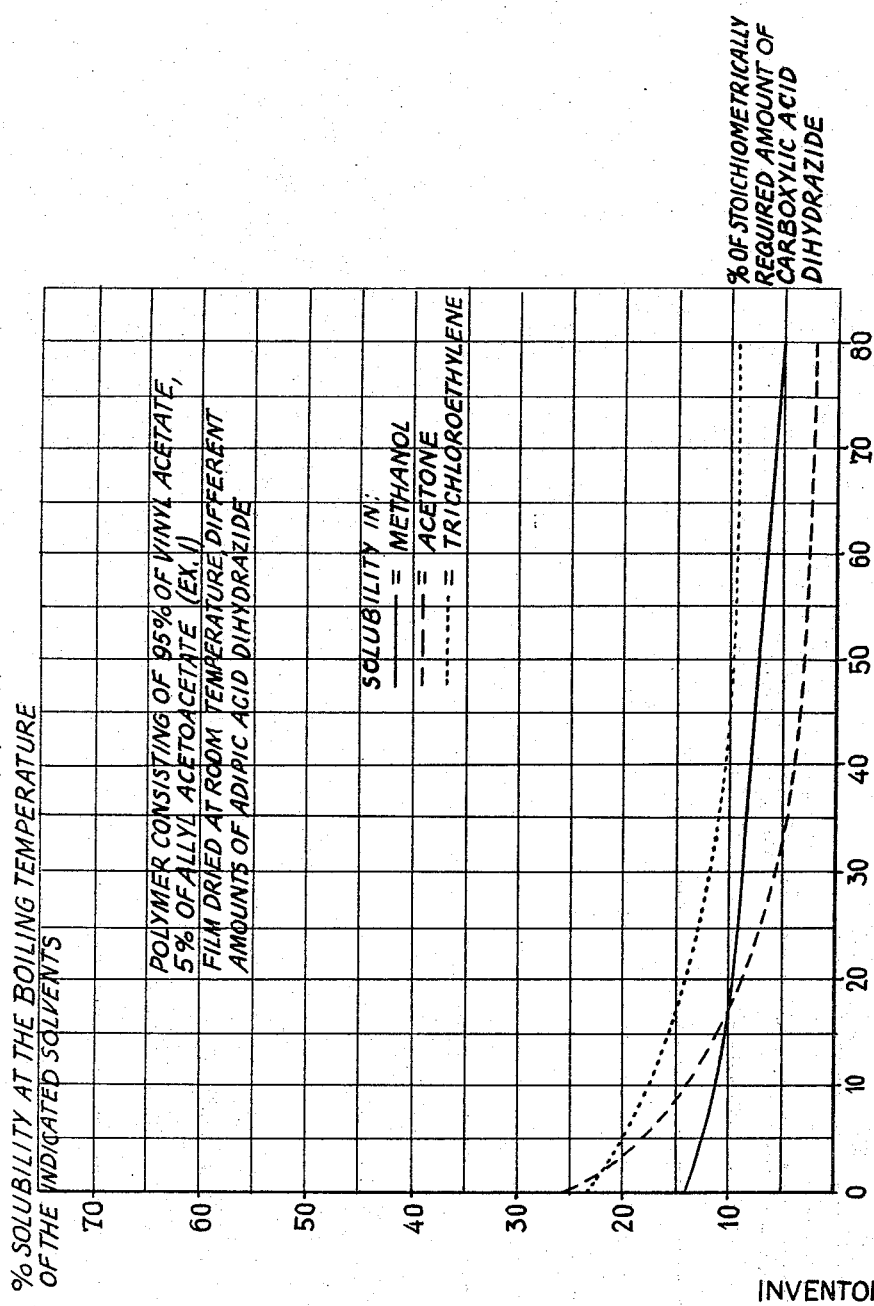
Figure 2:
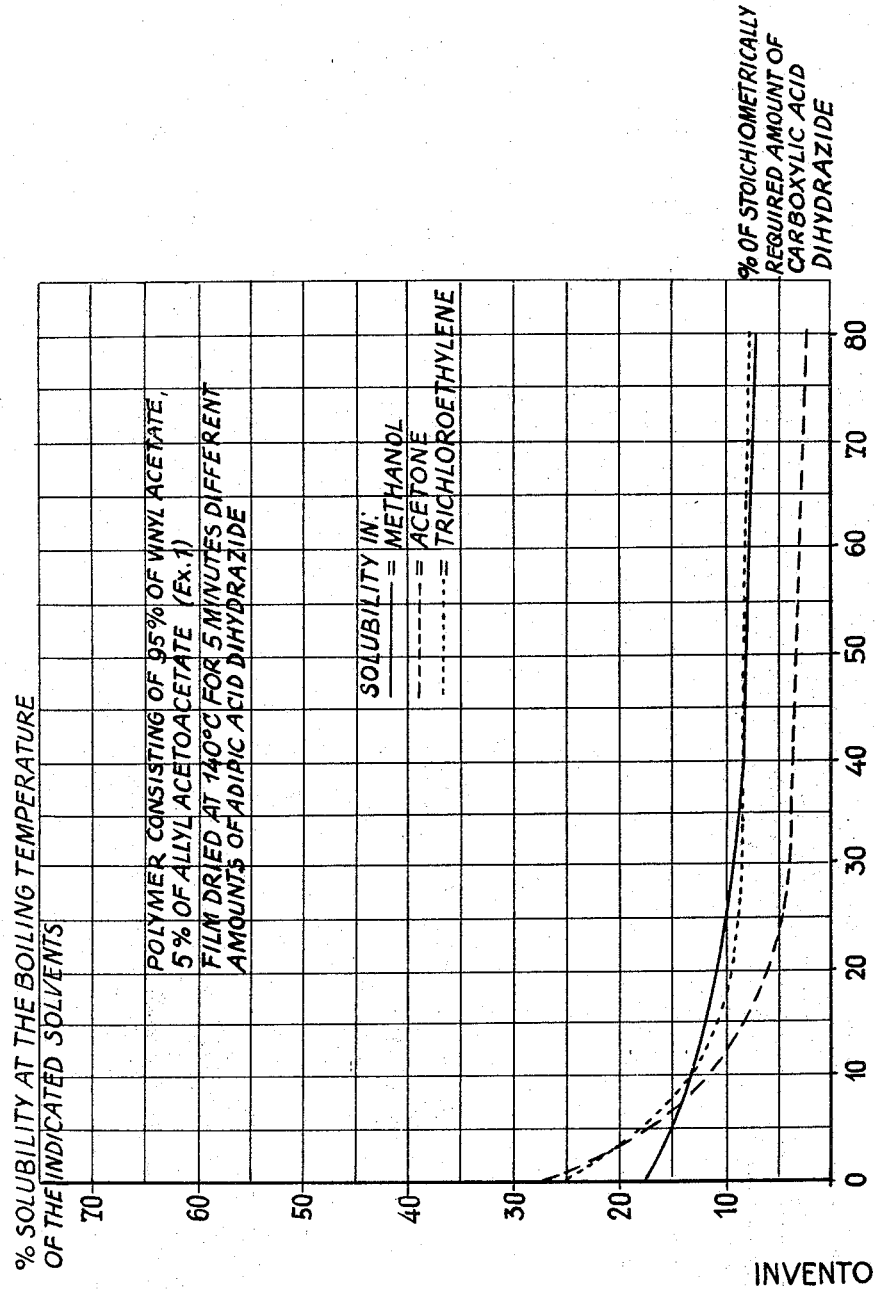

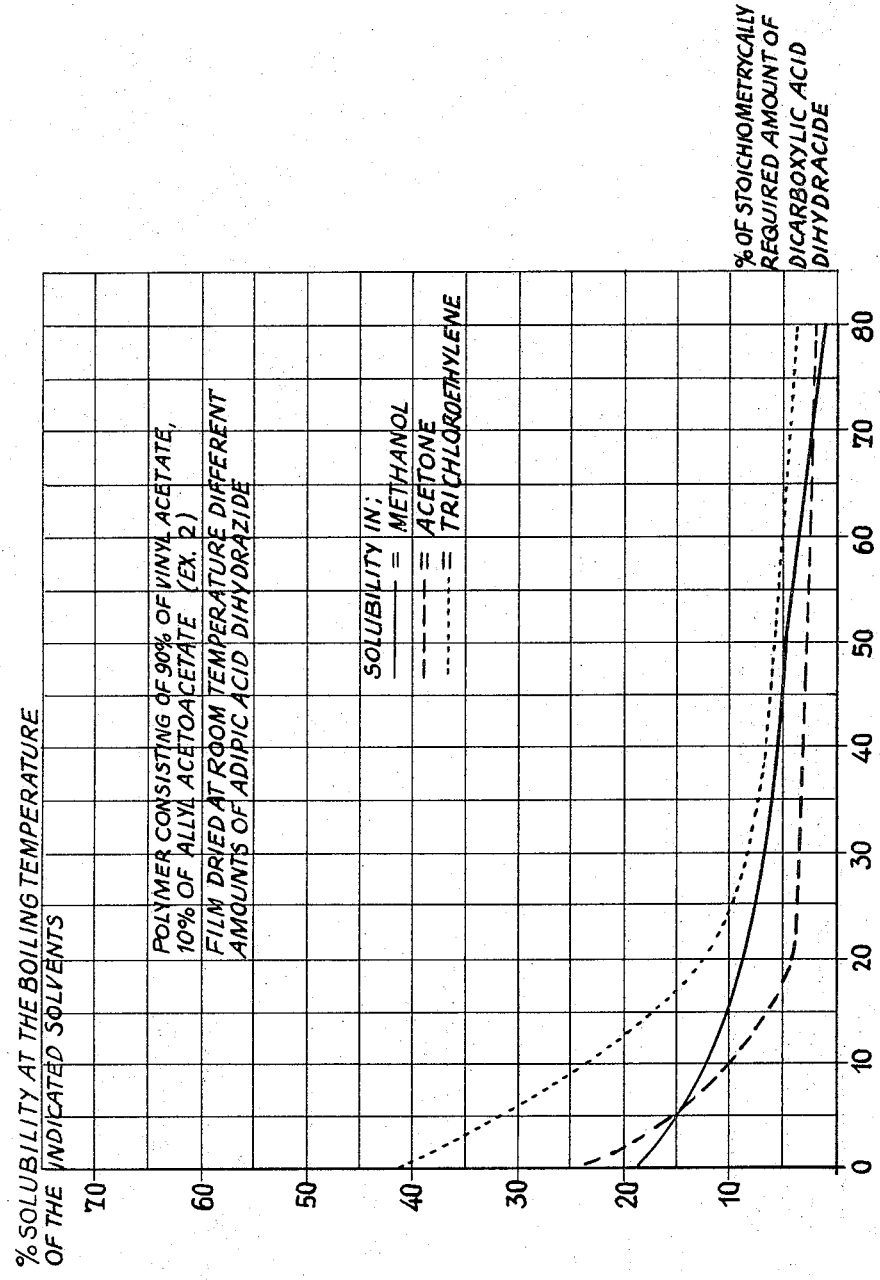

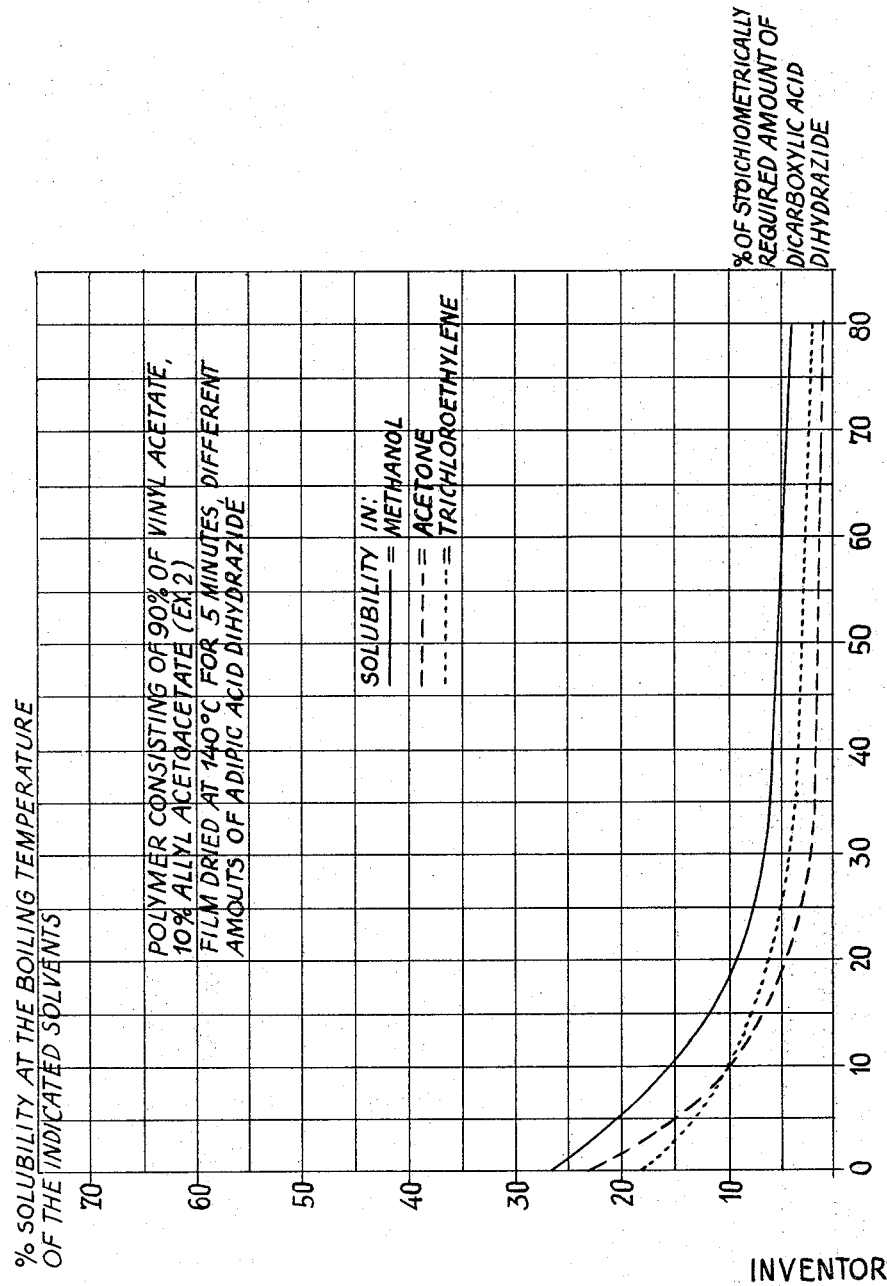

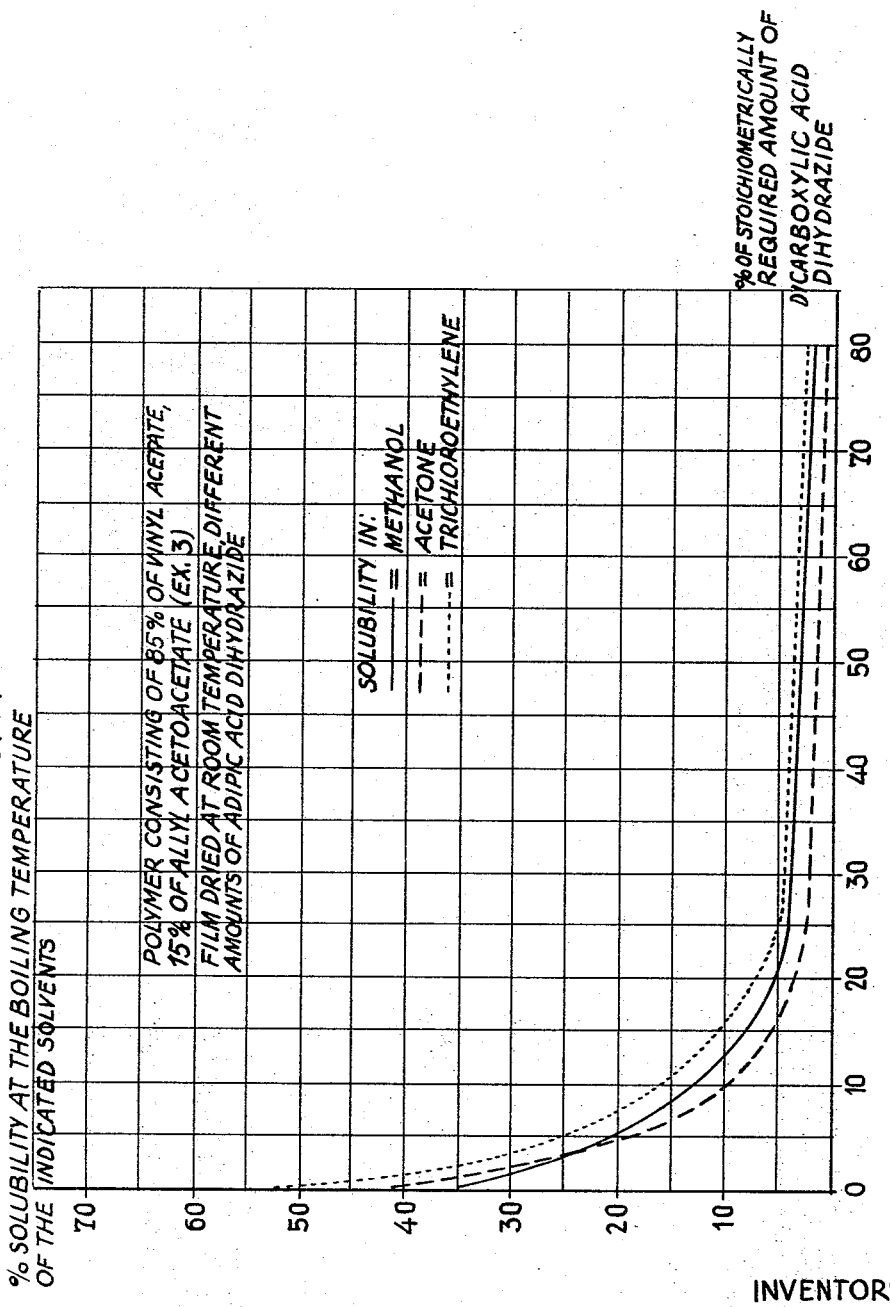

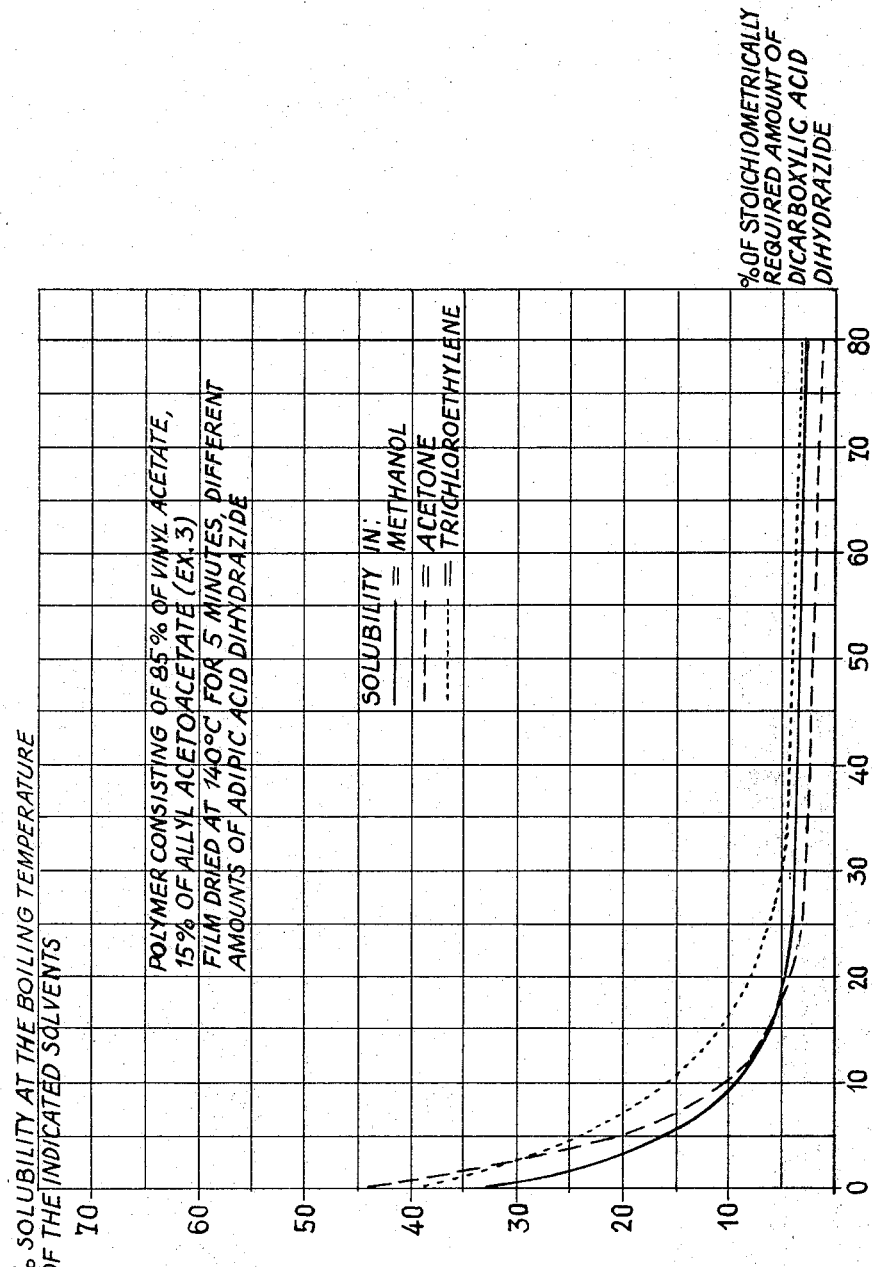

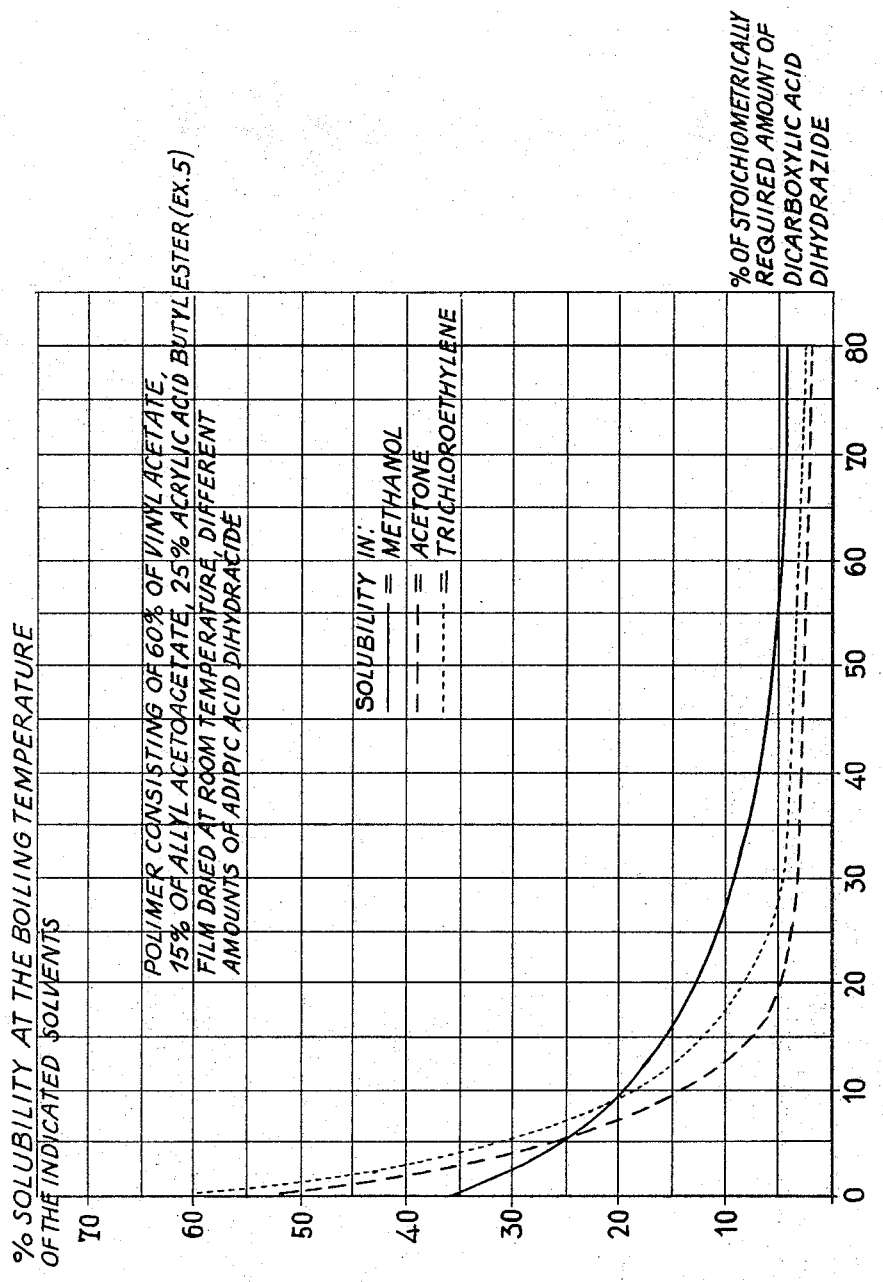

United States Patent Office 3,345,336
Patented Oct. 3, 1967

3,345,336
POLYMER OF AN UNSATURATED KETONE COMPOUND CROSSLINKED WITH A HYDRAZIDE OF A POLYBASIC CARBOXYLIC ACID
Alfred Kuhlkamp, Hofheim, Taunus, and Johann Wolfgang Zimmermann and Leonhard Bütschli, Frankfurt am Main, Germany, assignors to Farbwerke Hoechst Aktiengesellschaft vormals Meister Lucius & Bruning, Frankfurt am Main, Germany, a corporation of Germany
Filed Jan. 10, 1964, Ser. No. 336,984
Claims priority, application Germany, Jan. 11, 1963, F 38,751
7 Claims. (Cl. 260—63)

The present invention relates to homopolymers and copolymers of unsaturated keto compounds which have been cross-linked by polyfunctional carboxylic acid hydrazides.

Polymers are gaining importance in the most various fields, for example in textile, paper and leather industries. Numerous processes have been proposed and various monomers have been used to produce polymers having improved properties, particularly in the fields mentioned above. Amongst the polymers are preferably used those which still contain reactive groups, i.e. groups which can be further reacted for example by the addition of acids or alkalies or by heating. The polymer may be cross-linked on the substratum without undergoing reaction therewith or a real bond may be produced between the polymer and the substratum, for example a fiber.

Reactive polymers are, for example, those which contain methylol amide groups and are prepared, for example, by copolymerizing copolymerizable unsaturated compounds with acrylic acid methylol amide. Other monomers may likewise be used, for example vinyl epoxystearate or unsaturated masked isocyanates.

The reactive copolymers mentioned by way of example may be prepared according to known methods. A polymerization in solution or emulsion is preferred in those cases in which the final products are to be used in the form of a solution or dispersion, for example in textile finishing.

In textile industries polymers are increasingly used which have been rendered practically insoluble in solvents by cross-linking because, besides the fastness to boiling and washing, the impregnated fabrics must possess a resistance to organic solvents in view of the more and more commonly used dry cleaning.

It has now been found that polymers which are practically insoluble in water and organic solvents, can be obtained by homopolymerizing in aqueous emulsion olefinically unsaturated, polymerizable keto compounds or by copolymerizing the said compounds with suitable copolymerizable compounds which are little soluble or insoluble in water, and by cross-linking the polymer or copolymer obtained with at least one polyfunctional carboxylic acid hydrazide, i.e. a hydrazide of a polybasic carboxylic acid containing at least two hydrazide groups, the hydrazide being present in an amount of 20% to 150%, preferably 20% to 100%, calculated on the stoichiometric amount necessary for the reaction of all keto groups. One can suppose, without this supposition being intended to constitute a limitation of the present invention, that the cross-linking takes place according to the following scheme, illustrated with two macromolecules containing incorporated therewith acetoacetic acid vinyl ester as structural unit, the symbol $\xi$ indicating the portions of the macromolecule between which the acetoacetic acid vinyl ester unit has been incorporated.

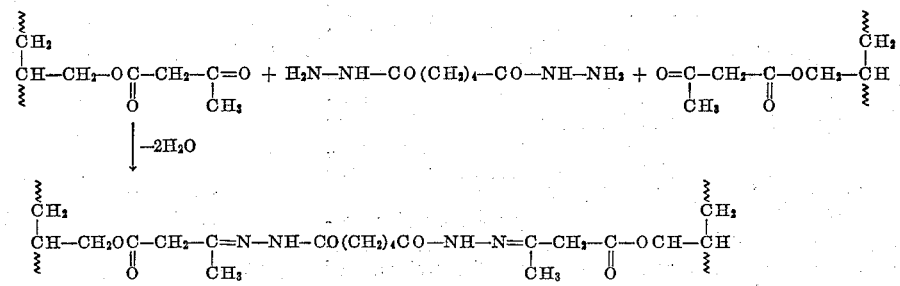

In order to link two mols of an incorporated keto compound, each containing one keto group, two hydrazide groups are required, for example, one mol of a dicarboxylic acid dihydrazide.

It could not be expected to obtain in this reaction practically insoluble polymers since the reaction producing cross-linking can only take place on the surface of the latex particles. The films made from the cross-linked polymers are insoluble in all solvents and do not swell practically when boiled for a prolonged period of time in methanol, acetone, gasoline or chlorinated hydrocarbons.

The cross-linking takes place at room temperature, i.e. at 20° within about 2 to 3 days. However, by the application of higher temperatures of up to 140° C., preferably 90–140° C. the time to complete the cross-linking can be essentially reduced, for example to 5 minutes. When fabrics are impregnated it is recommended to produce the cross-linking reaction on the material. In this case it is preferable to stir the component required for effecting cross-linking, i.e. the polyfunctional hydrazide, dissolved in a small amount of water into the dispersion shortly before it is used, although the dispersions containing the cross-linking component are stable for a prolonged period of time. For producing a rapid cross-linking a higher concentration is obviously required as obtained with the film-formation by evaporation of the water.

As compared with the usual processes, the process of the invention offers the advantage that a cross-linking can be produced at higher temperature, for example, 90–140° C., when operating according to the methods applied in textile industries and that in this manner cross-linked polymers are obtained which are insoluble in organic solvents and in water. On the other hand the cross-linking reaction can already be brought about at room temperature, i.e. about 20° C., this being of considerable interest when the aqueous dispersions are used as binder for the manufacture of paints. In this manner, paints can be produced which are resistant to solvents.

The homopolymers or copolymers of olefinically unsaturated polymerizable keto compounds are obtained by emulsion polymerization of suitable monomers under known conditions in aqueous phase containing emulsifiers and/or protective colloids in the presence of activators.

Suitable emulsifiers are the compounds used in the known emulsion polymerization processes, for example anionic compounds such as sodium lauryl sulfate, the sodium salt of p-alkyl-benzene-sulfonic acid, sodium oleate, sodium stearate, cationic compounds such as benzyl-trimethyl-ammonium sulfate or stearylbenzyl-dimethylammonium sulfate, nonionic compounds such as the condensation product of 1 mol of nonyl phenol with 20 mols of ethylene oxide or the condensation product of 1 mol of oleyl alcohol with 18–20 mols of ethylene oxide.

As protective colloids there may be used all known compounds applied in conventional emulsion polymerization processes, for example polyvinyl alcohols containing or being free from acetyl groups, in the case of polyvinyl alcohols containing acetyl groups the content thereof preferably being in the range of 5% to 20%. Other protective colloids for use in the process of the invention are, for example, water-soluble cellulose derivatives, such as hydroxyethyl cellulose, carboxymethyl cellulose, hydroxyethyl-carboxymethyl cellulose or other water-soluble polymers such as sodium alginate, gum arabic, water-soluble starch derivatives or the sodium salt of polyacrylic acid.

Catalysts to be used are preferably water-soluble percompounds such as are employed in known polymerization processes, for example the alkali metal salts of persulfuric acid or hydrogen peroxide. The catalysts can be used either alone or in combination with reducing agents such as $NaHSO_3$ or formaldehyde sodium sulfoxylate.

The auxiliaries mentioned above for carrying out the process of the invention are generaly used in the following concentrations, calculated on the weight of water used:

Emulsifiers 0.1%–3%, preferably 0.25%–1.5%
Protective colloids 0.2%–10%, preferably 1%–2.5%
Catalysts 0.005%–3%, preferably 0.05%–0.5%, calculated on the weight of the monomer phase.

Unsaturated polymerizable or copolymerizable keto compounds which can be used in the process of the invention are, for example, aliphatic olefinically unsaturated monoketo compounds such as vinyl esters or allyl esters of aliphatic monobasic or dibasic acids containing a keto group and having 4–8 carbon atoms, for example pyruvic acid, acetoacetic acid, levulinic acid, $\gamma,\gamma'$-dimethyl-$\alpha$-keto-caproic acid, methylene-acetoacetic acid or ethylidene acetoacetic acid. Furthermore, there may be used amides of aliphatic acids containing a keto group and having 4–8 carbon atoms, which amides are substituted at the nitrogen atom by a vinyl group or an allyl group. Olefinically unsaturated ketones, for example vinylmethyl ketone or vinylethyl ketone are likewise suitable.

Appropriate comonomers capable of being copolymerized with the aforesaid monomers are, for example:

(1) Vinyl esters in which the acid component has 1–20 and preferably 2–12 carbon atoms, such as acetic acid, propionic acid, butyric acid, or valeric acid, especially vinyl acetate and vinyl propionate;

(2) Esters of acrylic acid, methacrylic acid, maleic acid and fumaric acid and monohydric saturated aliphatic alcohols having 1–10 and preferably 3–8 carbon atoms. The monomers mentioned (sub 2) are advantageously used in combination with the unsaturated keto compounds and vinyl acetate;

(3) Styrene, vinyl chloride and also olefins such as ethylene, propylene or isobutylene.

In a copolymerization according to the invention the quantitative proportion of the monomers used can vary within a very wide range depending on the desired properties of the copolymers obtained. In general, about 1–50% and preferably 3–15% of unsaturated keto compounds are incorporated with the copolymers, calculated on the total weight of copolymer.

The emulsion polymerization is commonly carried out at a temperature within the range of 20 to 140° C., advantageously 60 to 95° C. It is possible to operate at low temperatures, above all when a redox system is used as catalyst. The polymerization can be accomplished either continuously or discontinuously.

The contents of solids of the dispresions obtained are within 30% and 65%, in most cases 45% to 50%, calculated on the total weight of the dispersion.

As polyvalent hydrazides of polybasic carboxylic acids there may be used the dihydrazides of aromatic dicarboxylic acids, for example of phthalic acid, isophthalic acid and terephthalic acid. It is especially advantageous to use the dihydrazides of aliphatic saturated dicarboxylic acids having 2–10 carbon atoms, for example the dihydrazide of oxalic acid or the dihydrazide of sebacic acid, and particularly the dihydrazide of adipic acid owing to their solubility in dilute organic acids, for example as at least 10% acetic acid. It is likewise possible, of course, to use hydrazides of more than dibasic acids, for example tri- or tetracarboxylic acids, containing at least 2 hydrazide groups. Still further, hydrazide containing at least 2 hydrazide groups of polymeric carboxylic acids may be used, for example of polyacrylic acid.

The homopolymers and copolymers produced by the process of the invention are suitable for use in many fields of application, for example in paint and adhesive industries. They can be used with special advantage as agents for treating and improving the quality of leather, textile materials and paper.

The following examples serve to illustrate the invention but they are not intended to limit it thereto, the parts and percentages being by weight unless otherwise stated.

*Example 1*

In a three-necked flask provided with agitator, reflux condenser and dropping funnel a solution was prepared from:

| | Parts |
|---|---|
| Sodium salt of p-dodecylbenzenesulfonic acid | 10 |
| Sodium salt of vinylsulfonic acid | 13 |
| and | |
| Water | 540 |

The pH of the aqueous phase was adjusted to 4 with acetic acid and 3 parts of sodium acetate were added.

The aqueous phase was heated to 70° C. in a water bath, a solution of 1.3 parts of potassium persulfate in 20 parts of distilled water was added and then 600 parts of a monomer mixture consisting of 570 parts of vinyl acetate and 30 parts of aceto-acetic acid allyl ester were dropped in the course of 3 hours.

A solution of 1.3 parts of potassium persulfate in 20 parts of distilled water was added 90 minutes after the beginning of the addition of the monomer mixture and after the addition of the said mixture, respectively.

It is recommended to raise the reaction temperature to 78–82° C. after the addition of about 5% of the monomer mixture and to maintain this temperature during the addition of the total monomer mixture by regulation of the temperature of the water bath. 30 minutes after the end of the monomer addition the dispersion was cooled to room temperature. A dispersion was obtained having a solids content of about 50% and a pH of 3.5.

In order to obtain a cross-linked polymer, a solution of 15 parts of adipic acid dihydrazide in 100 parts of water was stirred into the dispersion at room temperature. Films were cast from the dispersion obtained and dried either for some time at room temperature or for about 5 minutes at 140° C. In either case cross-linked polymers were obtained as can be seen from the results indicated in the following table.

*Examples 2-7*

Dispersions were prepared as described in Example 1 with the exception that instead of the monomer mixture of 570 parts of vinyl acetate and 30 parts of acetoacetic acid allyl ester the following monomer mixtures were used:

| Example No. | 2 | 3 | 4 | 5 | 6 | 7 |
|---|---|---|---|---|---|---|
| Vinyl acetate, parts | 540 | 510 | 480 | 360 | 330 | 330 |
| Acrylic acid butyl ester, parts | | | | 150 | 180 | |
| Maleic acid dibutyl ester, parts | | | | | | 180 |
| Acetoacetic acid allyl ester, parts | 60 | 90 | 120 | 90 | 90 | 90 |
| Adipic acid dihydrazide added for cross-linking, parts | 30 | 45 | 60 | 45 | 45 | 45 |

From the dispersions obtained according to Examples 1–7 and containing the indicated amounts of adipic acid dihydrazide, films were cast and dried at room temperature. The films were:

(a) Stored for 48 hours at room temperature, or
(b) Heated for 5 minutes at 140° C.

The films obtained were boiled for about 30 minutes in methanol, ethanol and trichloroethylene, respectively. In order to determine the solubility of the films in the aforesaid solvents, the residue was measured each time.

RESULTS

| Polymer according to Example | Solubility after drying at room temperature, percent | | | Solubility after heating for 5 minutes at 140° C., percent | | |
|---|---|---|---|---|---|---|
| | $CH_3OH$ | $CH_3COCH_3$ | $CHClCCl_2$ | $CH_3OH$ | $CH_3COCH_3$ | $CHClCCl_2$ |
| 1 | 5.5 | 2 | 9 | 7 | 2 | 7.5 |
| 2 | 2 | 2 | 4.5 | 4 | 1 | 2 |
| 3 | 2 | 1 | 2.5 | 2.5 | 1 | 3 |
| 4 | 4 | 4 | 4 | 3 | 1 | 3 |
| 5 | 4 | 2 | 2.5 | 3 | 2 | 2 |
| 6 | 8 | 15 | 6 | 3 | 8 | 2 |
| 7 | 4 | 8 | 3 | 3 | 8 | 2 |
| Polyvinyl-acetate | 80–100 | 75–100 | 75–100 | 85–100 | 70–100 | 70–100 |

The aforesaid examples reveal that polymers containing a relatively small amount of acetoacetic acid allyl ester incorporated therein, for example 5%, are cross-linked to such an extent that they are practically insoluble. On the other hand, the amount of dicarboxylic acid dihydrazide required for substantial cross-linking can be considerably reduced. About 20% of the amount of dihydrazide equivalent to the acetoacetic acid allyl ester are sufficient, for example, as shown by the accompanying drawings.

*Example 8*

In the apparatus described in Example 1 a polymerization mixture was prepared from:

| | Parts |
|---|---|
| Sodium salts of ethenesulfonic acid | 6 |
| Sodium salt of p-dodecylbenzene-sulfonic acid | 5 |
| Water | 270 |

The pH of the solution was adjusted to 4 by adding acetic acid. 1.5 parts of sodium acetate were added and the aqueous phase was heated to 70° C.

The catalysts used were: 2 parts of potassium persulfate dissolved in 30 parts of water. Every 30 minutes 5 parts of the solution were dropped in.

Simultaneously, 255 parts of vinyl acetate, and 45 parts of levulinic acid were added within the course of 3 hours.

One hour after the end of the addition the about 50% dispersion was cooled to room temperature.

A film made from the dispersion by evaporation of the water was completely soluble in methanol, acetone and trichloroethylene.

A solution of 1.9 parts of adipic acid dihydrazide in 14 parts of water acidified with acetic acid to pH 5 was added to 50 parts of the dispersion obtained while stirring.

Clear films cast from the mixture at 20° C. were practically insoluble and unswellable in organic solvents. Analogous to Examples 1–7, the films were boiled in methanol or acetone or trichloroethylene; their solubility was:

| In: | Percent |
|---|---|
| Methanol | 3.4 |
| Acetone | 2.0 |
| Trichloroethylene | 0.8 |

*Example 9*

A dispersion was prepared as described in Example 8. Instead of the monomer mixture of 255 parts of vinyl acetate and 45 parts of levulinic acid allyl ester, a mixture was used consisting of 255 parts of vinyl acetate and 45 parts of $\gamma,\gamma'$-dimethyl-$\alpha$-ketocaproic acid allyl ester.

A solution of 2.6 parts of adipic acid dihydrazide in 12 parts of water acidified to pH 5 with acetic acid was added to 100 parts of the dispersion obtained while stirring.

The films made from the mixture were dried for 5 minutes at 140° C. and tested as defined in Examples 1–7 as to their solubility; the soluble portion was:

| In: | Percent |
|---|---|
| Methanol | 4.9 |
| Acetone | 4.5 |
| Trichloroethylene | 0.8 |

We claim:
1. A process for the production of cross-linked polymers which comprises reacting at a temperature within the range of 20° C. to 140° C. a hydrazide of a polybasic carboxylic acid containing at least two hydrazide groups wherein the carboxylic acid is an acid selected from the group consisting of phthalic acid, isophthalic acid, terphthalic acid, an aliphatic saturated dicarboxylic acid having from 2 to 10 carbon atoms or a polyacrylic acid; with a polymer obtained by polymerization of an olefinically unsaturated keto compound in aqueous emulsion wherein the polymer is selected from the group consisting of a homopolymer and a copolymer wherein the polymer is derived from a vinyl ester of an aliphatic monobasic acid containing a keto group, said acid having 4 to 8 carbon atoms; a vinyl ester of an aliphatic dibasic acid containing a keto group, said acid having 4 to 8 carbon atoms; an allyl ester of aliphatic monobasic acids containing a keto group, said acid having 4 to 8 carbon atoms; an allyl ester of an aliphatic dibasic acid containing a keto group, said acid having 4 to 8 carbon atoms; a vinyl substituted amide of an aliphatic acid having a keto group, said aliphatic acid having 4 to 8 carbon atoms; an allyl substituted amide of an aliphatic acid having a keto group, said aliphatic acid having 4 to 8 carbon atoms; vinylmethyl ketone, vinylethylketone and wherein the copolymer having the keto group containing monomer has as a comonomer a monomer selected from at least one member of the group consisting of a vinyl ester of an acid having from 1 to 20 carbon atoms, an ester of acrylic acid, methacrylic acid, maleic acid and fumaric acid wherein the ester is derived from a monohydric saturated aliphatic alcohol having from 1 to 10 carbon atoms, styrene, vinyl chloride, ethylene, propylene and isobutylene, the said hydrazide being present in an amount of 20% to 150%, calculated on the stoichiometric amount necessary for the reaction of all keto groups.

2. A process as claimed in claim 1 wherein a polymer of the allyl ester of acetoacetic acid is cross-linked.

3. A process as claimed in claim 1 wherein a polymer of the allyl ester of levulinic acid is cross-linked.

4. A process as claimed in claim 1 wherein a polymer of the vinyl ester of levulinic acid is cross-linked.

5. A process as claimed in claim 1 wherein the polymer is cross-linked by a dihydrazide of an aliphatic saturated dicarboxylic acid having 2–10 carbon atoms.

6. A process as claimed in claim 1 wherein a polymer is cross-linked by adipic acid dihydrazide.

7. A polymer of an olefinically unsaturated keto compound wherein the polymer is selected from the group consisting of a homopolymer and a copolymer wherein the polymer is derived from a vinyl ester of an aliphatic monobasic acid containing a keto group, said acid having 4 to 8 carbon atoms; a vinyl ester of an aliphatic dibasic acid containing a keto group, said acid having 4 to 8 carbon atoms; an allyl ester of aliphatic monobasic acids containing a keto group, said acid having 4 to 8 carbon atoms; an allyl ester of an aliphatic dibasic acid containing a keto group, said acid having 4 to 8 carbon atoms; a vinyl substituted amide of an aliphatic acid having a keto group, said aliphatic acid having 4 to 8 carbon atoms; an allyl substituted amide of an aliphatic acid having a keto group, said aliphatic acid having 4 to 8 carbon atoms; vinylmethyl ketone, vinylethylketone and wherein the copolymer having the keto group containing monomer has as a comonomer a monomer selected from at least one member of the group consisting of a vinyl ester of an acid having from 1 to 20 carbon atoms, an ester of acrylic acid, methacrylic acid, maleic acid and fumaric acid wherein the ester is derived from a monohydric saturated aliphatic alcohol having from 1 to 10 carbon atoms, styrene, vinyl chloride, ethylene, propylene and isobutylene cross-linked by a hydrazide of a polybasic carboxylic acid containing at least two hydrazide groups wherein the carboxylic acid is an acid selecting from the group consisting of phthalic acid, isophthalic acid, terphthalic acid, an aliphatic saturated dicarboxylic acid having from 2 to 10 carbon atoms or a polyacrylic acid.

References Cited

UNITED STATES PATENTS

| | | | |
|---|---|---|---|
| 2,764,570 | 9/1956 | Kowolik et al. | 260—63 |
| 2,847,395 | 8/1958 | Wear | 260—47 |
| 2,970,972 | 2/1961 | Wear et al. | 260—47 |

WILLIAM H. SHORT, *Primary Examiner.*

C. WENDEL, L. LEE, *Assistant Examiners.*